United States Patent [19]

Nordh

[11] 4,056,282
[45] Nov. 1, 1977

[54] SAFETY HARNESS FOR MOTOR VEHICLES

[75] Inventor: Rolf Göran Nordh, Storfors, Sweden

[73] Assignee: Hakanssons Manufaktur AB, Amal, Sweden

[21] Appl. No.: 687,880

[22] Filed: May 19, 1976

[51] Int. Cl.² .............................................. A62B 35/00
[52] U.S. Cl. .................................................... 297/389
[58] Field of Search ...................... 297/389, 385, 384; 292/16, 43; 280/744, 747

[56] References Cited

U.S. PATENT DOCUMENTS

| 283,380 | 8/1883 | Cooper | 292/43 |
| 2,047,637 | 7/1936 | Kirsch | 292/43 |
| 3,526,431 | 9/1970 | Boedigheimer | 297/389 X |
| 3,748,011 | 7/1973 | Hazzard | 312/333 |

FOREIGN PATENT DOCUMENTS 2,303,222  8/1974  Germany .............................. 297/389

Primary Examiner—James T. McCall
Attorney, Agent, or Firm—Witherspoon, Lane & Hargest

[57] ABSTRACT

An arrangement in a motor vehicle safety harness permitting said harness to be fastened in various positions of adjustment and comprising a slide to which one end of the harness is attached, said slide running along a guide member and provided both with a locking pin moving freely in a bore in said slide, and also with a clamping bolt, said bolt arranged, when turned in one direction, to press said locking pin into engagement with said guide member, thus fastening the harness in the desired position along the guide member.

3 Claims, 7 Drawing Figures

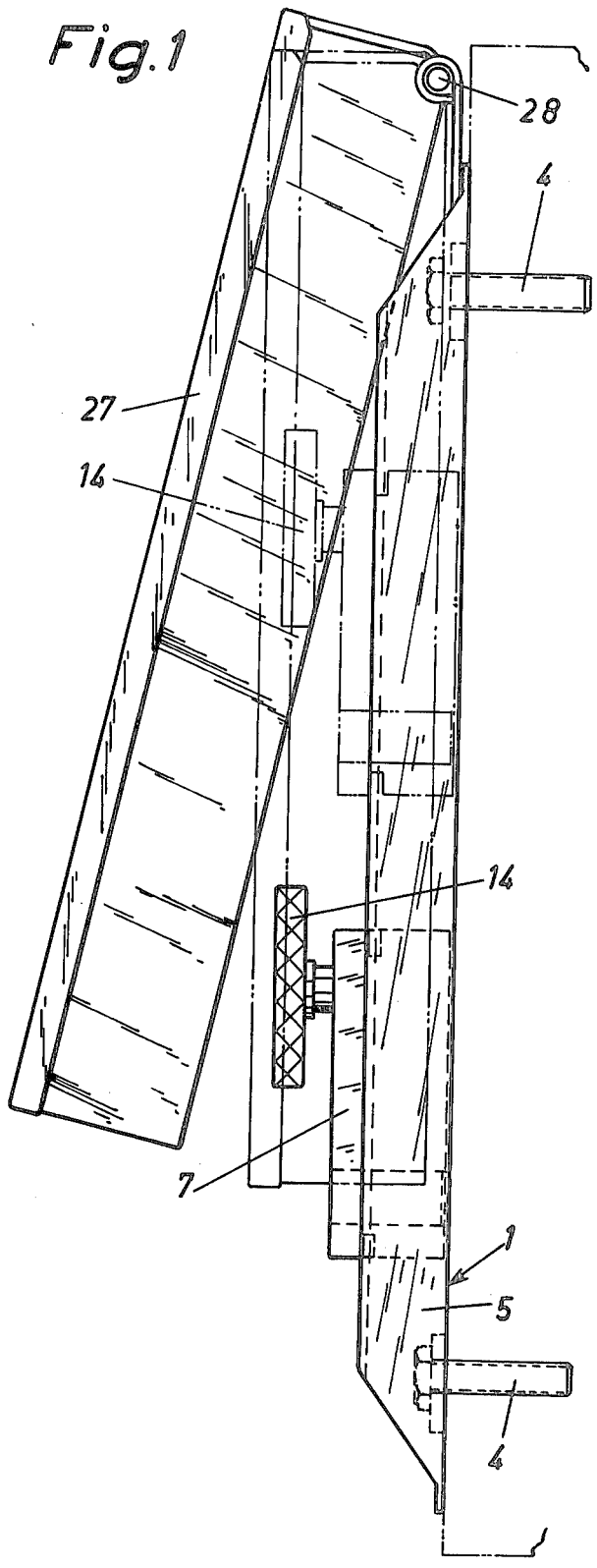
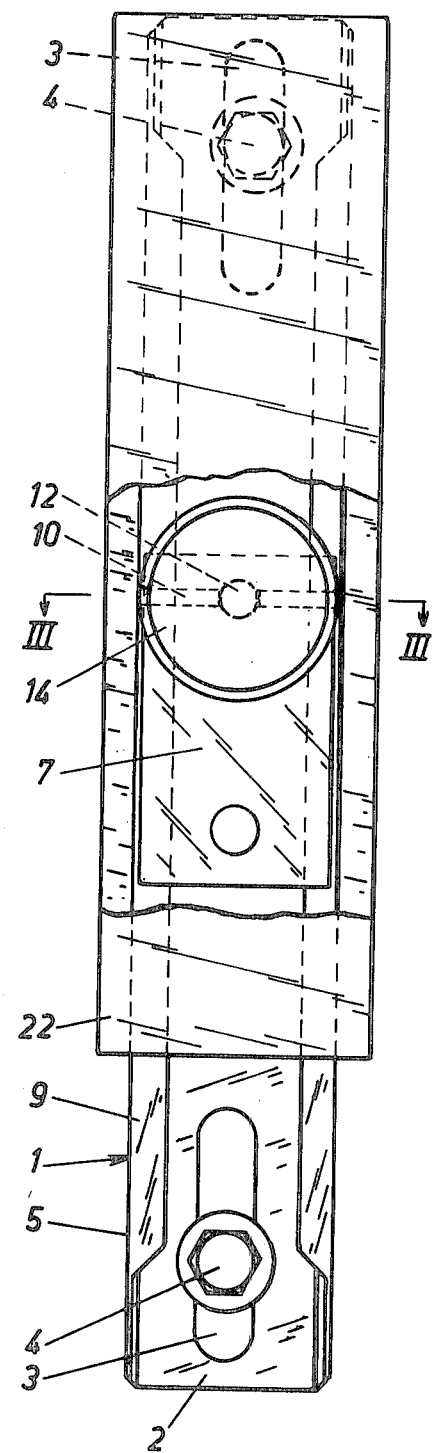

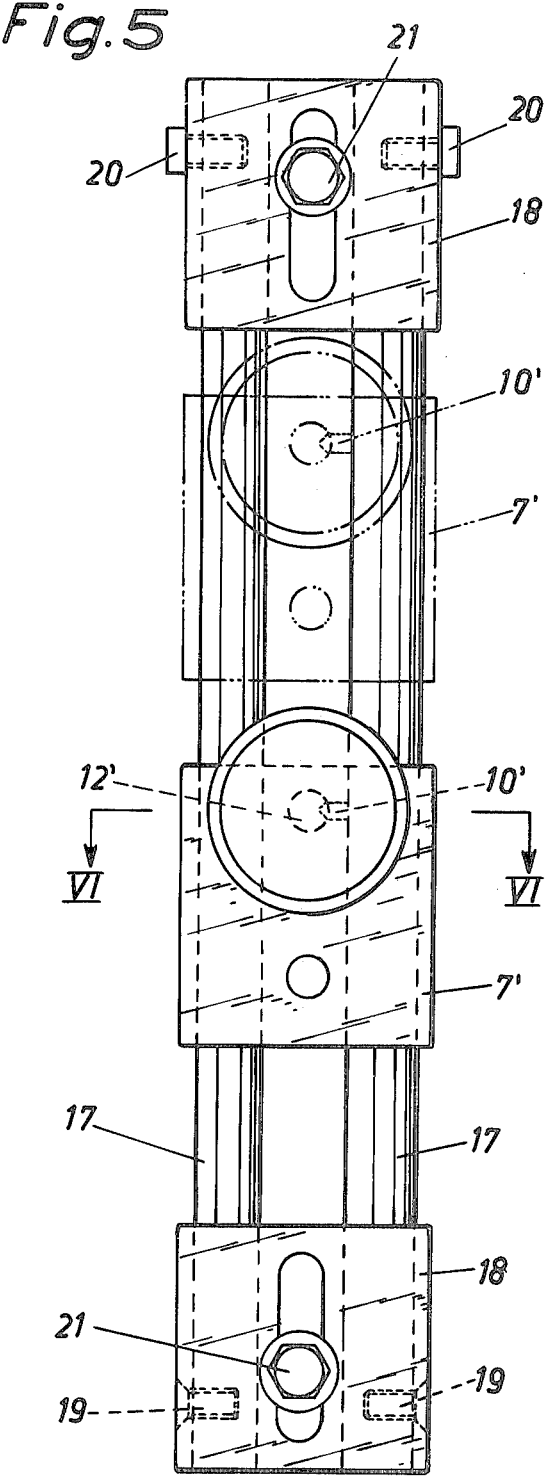
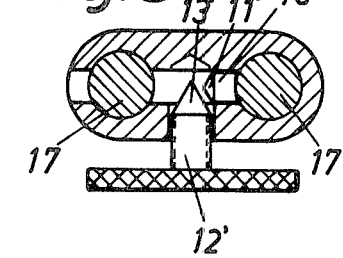

SAFETY HARNESS FOR MOTOR VEHICLES

BACKGROUND OF THE INVENTION

The present invention concerns an arrangement in safety harnesses for motor vehicles, comprising a fastening device for securement of the harness at the lower end thereof inwardly of a vehicle seat and a second fastening device for securement of the harness at the upper end thereof outwardly of the seat, at least one of said fastening devices comprising a slide to which one end of the harness is attached and which may be set in various positions of adjustment.

Several mechanisms are known in which the harness ends are secured to displaceable means in order to make it possible to adjust the width of the harness, the height of the fastening means, and so on, to fit the person about to use the harness. Such mechanisms may be set in a few positions only, which largely reduces the possibilities of adjustment. Other mechanisms permit setting in a large number of close positions, such as e.g. along a toothed rod. However, mechanisms of this kind are considerably more complicated than the type mentioned initially and also require more elaborate manipulation.

SUMMARY OF THE INVENTION

The purpose of the present invention is to provide a mechanism permitting adjustment of safety harnesses for motor vehicles, which mechanism is very simple in structure while at the same time making possible completely stepless setting of the harness fastening device. In accordance with the present invention this has been achieved in that the slide runs along a guide member and is provided both with at least one locking means which move freely in a bore made in the slide towards and away from the guide member and the inner end of which has a conical or spherical configuration, and with a clamp bolt formed with a conical portion and disposed in a position wherein it is at an angle to the bore housing the locking means, said clamp bolt arranged upon its displacement in the axial direction to force its conical portion against the conical or spherical end of the locking means so as to press said locking means into abutment against the guide member.

BRIEF DESCRIPTION OF THE DRAWINGS

Various embodiments of the invention will be described more in detail in the following with reference to the accompanying drawings, wherein FIG. 1 is a side view of one embodiment of the invention, FIG. 2 is a side view from the front of said embodiment, FIG. 5 is a view from the front of a second embodiment of the device in accordance with this invention, FIG. 6 is a sectional view along line VI—VI of FIG. 5.

DETAILED DESCRIPTION OF A PREFERRED EMBODIMENT

Figure 7:
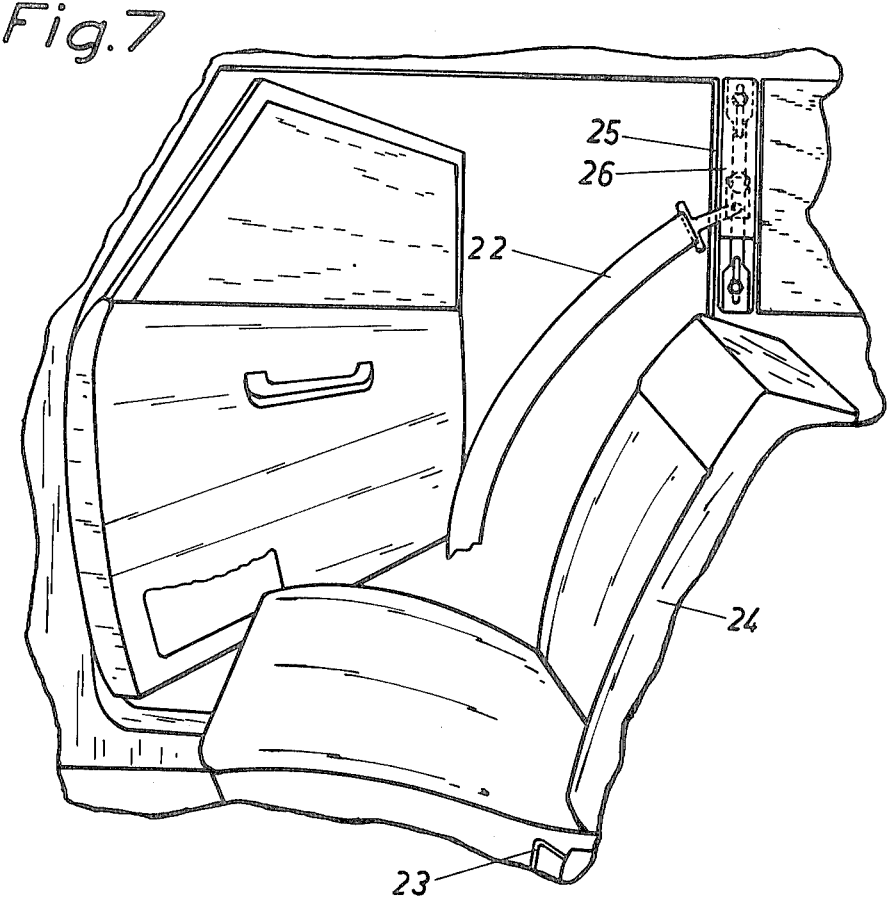
FIG. 7 is a view, illustrating the device in situ, as applied in a motor vehicle.

In the embodiment illustrated in FIGS. 1 to 4 the guide member is in the form of a rail consisting of a bottom section 2 having slots 3 therein adjacent the rail ends to enable the rail to be secured to a support by means of bolts 4 or similar means, and of two side walls 5 whereby a channel 6 is formed. A slide 7 is arranged inside the channel 6 in a manner permitting it to be freely displaceable therein. The slide 7 is provided with longitudinally extending grooves 8 in which are received opposed edges 9 projecting transversely from the side walls 5. Through this arrangement the slide member is prevented from falling out or being pulled away from the rail 1 in the transverse direction.

In accordance with this embodiment of the invention the slide further comprises two co-axially positioned locking means in the form of locking bars 10, which bars move freely in bores formed in the slide in the direction towards and away from the side walls 5 of the rail 1. The facing inner ends 11 of the locking bars 10 are in the form cones. In addition, the slide 7 is provided with a threaded clamp bolt 12 formed with a matching conical portion 13. By means of this conical portion 13 the clamp bolt 12 abuts against the conical bar ends 11. At its outer end the clamp bolt 12 is provided with a turning wheel 14 and at its inner end it is formed with a pin 15 passing through an aperture 16 formed in the bottom portion of the slide 7.

Figure 3:
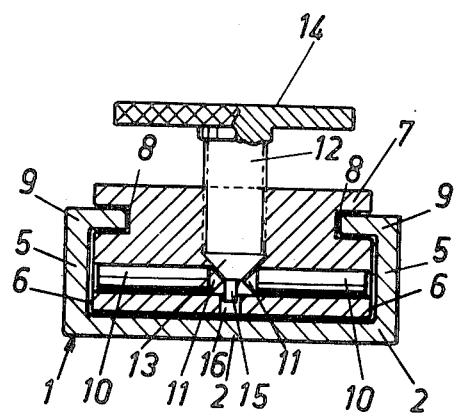
FIGS. 3 and 4 are sectional views along line III—III of FIG. 2 showing the device in two different positions.
Figure 4:
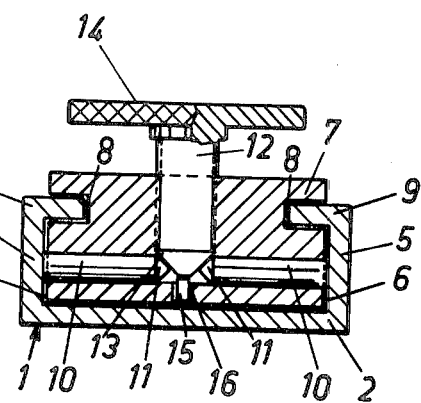

In accordance with the position illustrated in FIG. 3, the slide 7 travels freely along the rail 1. When the bolt 12 is screwed in by means of the wheel 14 the conical portion 13 will be pushed between the two conical ends portions 11 of the locking bars 10, pressing them apart, whereby the bars in turn will press against the inner faces of the side walls 5, thus locking the slide 7 in the position in which it is set. The arrangement outlined provides very efficient and secure locking of the details involved. At the same time, the adjustment may be effected in infinitely minute degrees. When the bolt 12 is thightened hard, its pin 15 will press against the bottom 2 of the rail and this manner contribute to the securement of the slide.

FIGS. 5 and 6 illustrate another embodiment of the invention. In this case two parallel rods 17 serve as the guide member, the rods being kept in spaced relationship by means of securement elements at the rod ends. These securement elements consist of plates 18 in accordance with the embodiment illustrated and the rods 17 are attached to the plates by means of screws 19 and 20, the plates in turn being attached to the vehicles chassis by means of screws 21. A slide 7' is arranged to run along the rods, gripping the latter. The slide 7' has a simplified locking mechanism comprising only one single locking bar 10' provided with a conical inner end 11' like the bars in accordance with the first embodiment, and a threaded clamp bolt 12' with a conical portion 13'. This locking mechanism operates in the same way as described above for the first embodiment.

FIG. 7 illustrates an example of application of the inventive object in a car. In this example the safety harness 22 has a stationary fastening device 23 at the lower point inwardly of the vehicle seat 24 and an adjustable fastening device 26 in accordance with the invention at the upper point inwardly of the vehicle seat in the door-frame. By adjusting the fastening device 26 in various vertical positions the height of the harness 2 thus may be varied to suit the length of the person that is to use the harness.

As a possible alternative, or as a supplement, the stationary fastening device 23 may be replaced by a fastening device in accordance with the invention, thus further increasing the possibilities of adjustment of the harness 22.

Above the various components making up the inventive object in accordance with the first embodiment may be attached to a lid portion 27 which is pivotable about a hinge 28. For traffic safety reasons the lid portion 27 is preferably provided with a thick pad (not illustrated in the drawings) which possesses good impact take-up qualities.

The invention is not limited to the embodiments described above and illustrated in the drawings but may be varied in a variety of ways within the scope of the appended claims. For instance, the locking mechanism may be a ball which is forced by a conical portion of the clamp bolt into a ball seat in a rod or a rail. Furthermore, instead of having threads the clamp bolts may be spring-loaded in a way enabling the ball serving as a locking member to be relased from the guide locking position when the clamp bolt is displaced against the action of a spring means.

What I claim is:

1. An improved device in safety harnesses for motor vehicles, said device comprising a first fastening device for securement, of the harness at its lower end inwardly of a vehicle seat and a second fastening device for securement of the harness at the upper end outwardly of the vehicle seat, a slide provided on at least one of said fastening devices, said slide having one end of said harness attached thereto and arranged to be set in various positions of adjustment, the improvement comprising a guide member along which said slide is arranged to run, said guide including a pair of parallel rods, brackets affixed to both ends of the rod pair to retain same in fixed relative position, means on said brackets for attaching said guide to the desired vehicle portion, said slide comprising a body portion having parallel openings therein sized to slidably fit on the aforesaid parallel rods, said slide body having a bore made therein and provided with at least one locking means, said locking means moving freely in said bore in said slide body in a direction towards and away from one of the guide rods, the inner end of said locking means having a conical configuration, said slide body also provided with a clamp bolt formed with a conical portion and disposed in a position wherein it is at an angle to said bore containing said locking means, said clamp bolt arranged, upon its displacement in the axial direction, to urge its conical portion against the conical end of said locking element so as to press said locking means into abutment against one of the guide rods.

2. The invention as set forth in claim 1 and wherein the slide bore extends transversely of the parallel openings in the slide body and further wherein the locking means portion which engages one of the guide rods is configured to evenly grip said rod.

3. The invention as set forth in claim 2 and wherein the guide brackets are provided with means to make them movable fore and aft for adjustment purposes.

* * * * *